Nov. 17, 1936.  O. F. ROHWEDDER  2,061,315
ART OF AND MACHINE FOR SLICING BAKERY PRODUCTS
Filed Feb. 18, 1935
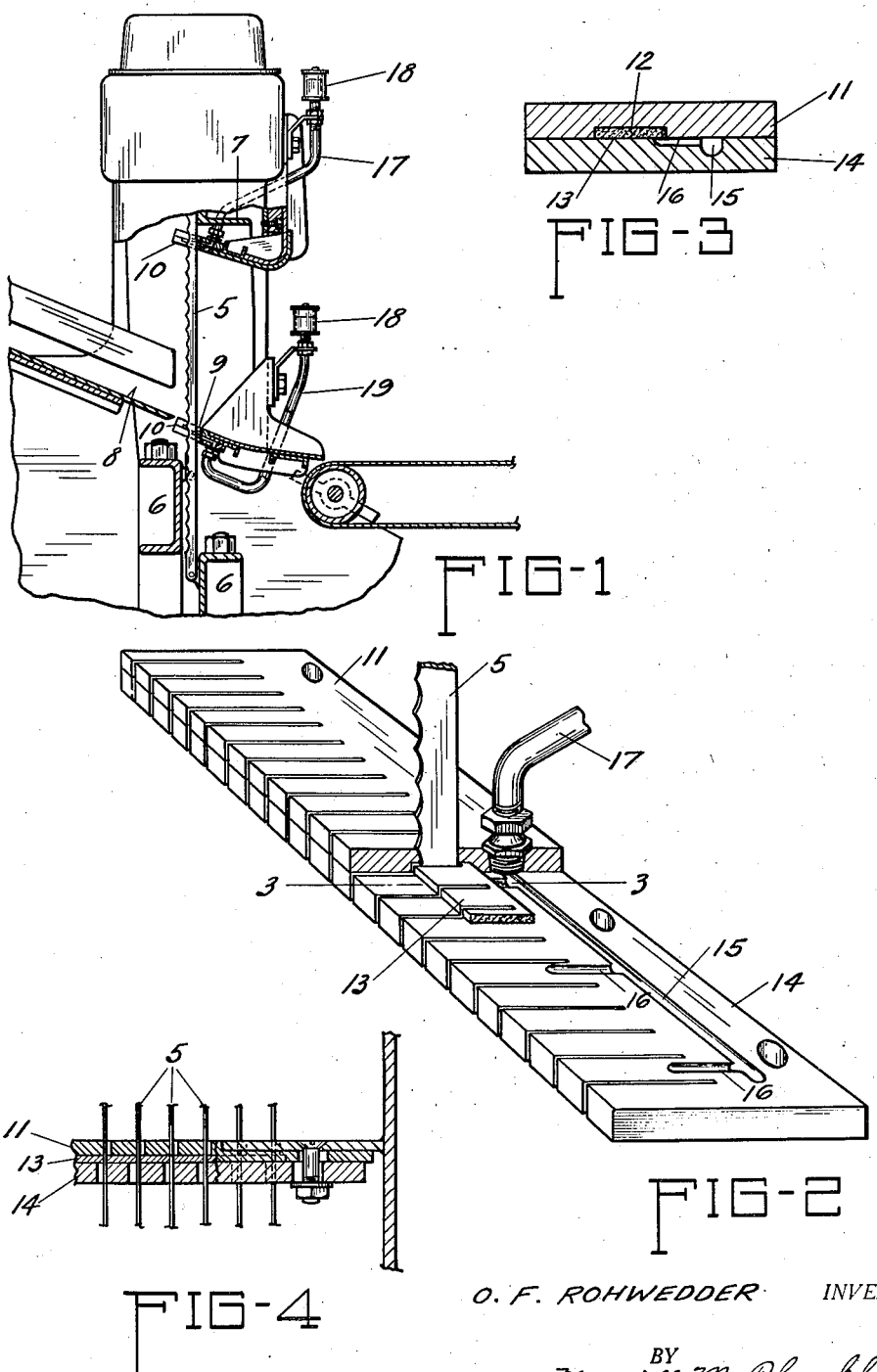
O. F. ROHWEDDER   INVENTOR.
BY Merrill M. Blackburn
ATTORNEY Patented Nov. 17, 1936

2,061,315

UNITED STATES PATENT OFFICE

2,061,315

ART OF AND MACHINE FOR SLICING BAKERY PRODUCTS

Otto F. Rohwedder, Davenport, Iowa, assignor to Micro-Westco, Incorporated, Bettendorf, Iowa, a corporation of Delaware Application February 18, 1935, Serial No. 6,946

7 Claims. (Cl. 146—153)

The present invention relates to a method of slicing bakery products and a machine for accomplishing that purpose. It relates more particularly to the commercial slicing of bread and other bakery products.

In the slicing of certain bakery products and especially certain kinds of bread, there is a tendency, on account of the bread being moist and of a rather sticky consistency, for the bread to accumulate on the cutting blades. It is understood that the cutters may be of the rotary type or of the more commonly used blade or endless band types and that this method is applicable thereto regardless of the type of cutters employed.

Among the objects of this invention are to provide a method of slicing which will obviate the difficulty experienced with certain types of bakery products consisting of adhesion of the substance of the product to the slicing blades; to provide a means for preventing adhesion of the substance of a bakery product to the slicing blades while said product is being sliced; to provide a mechanism whereby oil may be applied to the cutting blades of a slicing machine during the operation thereof so as to enable uninterrupted operation of the machine; and such further objects, advantages and capabilities as will hereafter appear and as are inherent in the construction disclosed herein. My invention further resides in the combination, construction, and arrangement of parts illustrated in the accompanying drawing and, while I have shown therein what is now regarded as the preferred embodiment of this invention, I desire the same to be understood as illustrative only and not to be interpreted in a limiting sense.

In the drawing annexed hereto and forming a part hereof,

Fig. 1 is a fragmentary elevation, partly in section, of a slicing machine embodying my present invention and adapted to carry out the new method herein set forth;

Fig. 2 is a perspective view of an equalizer employed in the machine illustrated in Fig. 1, a cutting blade and part of the equalizer being shown broken away;

Fig. 3 shows a transverse section taken substantially along the plane indicated by the line 3—3, Fig. 2;

Fig. 4 is a longitudinal section of a small part of an equalizer, together with the support by means of which it is supported in the machine.

Reference will now be made in greater detail to the annexed drawing for a more complete description of this invention. The slicing machine represented in Fig. 1 is of the reciprocable blade type comprising spaced supporting and guiding frame elements which are connected together at their top and bottom portions. Within this frame are a pair of vertically reciprocable blade carrying frames, each of which carries a plurality of cutting blades 5, as is well understood by any one skilled in the art. The lower crossbars of the blade frames are indicated by the numeral 6 and the upper crossbars by the numeral 7. In line with the feed table 8 is a crossbar which I call an equalizer. This and the corresponding equalizer above the channel through which the bakery product passes are denoted by the numerals 9 and 10. As illustrated in the annexed drawing, the equalizers are preferably made up of a pair of plates slotted for the reception of the blades 5. This construction is shown, described, and claimed in an application previously filed by me and it is therefore unnecessary to go into the details of that construction at this time.

In the present construction, the upper plate 11 is grooved throughout the major portion of its length, as indicated at 12, for the reception of a suitable piece 13 of oil absorbent material, such as felt or leather, which must have characteristics adapting it to the purpose for which it is used in this machine. Wherever I refer to this strip as "felt", it will be understood that this word is used in a generic sense to include suitable felt or wool fabric or wicking. The purpose of these absorbent strips is to absorb and become more or less saturated with a suitable fluid which, at the present time, is believed to be a certain light oil which is tasteless and odorless and which does not become rancid. Another function of these strips is to serve as wipers, cleaners, or scrapers to remove from the blades the substance of the bakery product as it adheres. The lower strip 14 of the equalizer is provided with a longitudinal groove 15 and transverse grooves 16 extending therefrom into part of the spaces between the slots in the edge of the equalizer.

A feed tube 17 leads from an oil container 18 to and through the upper plate 11 of the upper equalizer and delivers the oil at a definite rate to the channel 15. From this channel 15, the oil feeds through the channels 16 to the strip 13 which is thereby kept saturated. The word "saturated", as used in this specification and the appended claims, is intended to include either partly or wholly filled with liquid. Therefore, as the blades 5 reciprocate through the slots in the strip 13, the oil is spread over the surface of the blades and they are thereby kept moistened. A second oil feed cup 18 is connected by means of a pipe 19 to the channel 15 of the lower equalizer and supplies this with oil in the same manner that the upper equalizer is supplied therewith, as described above. Thus, the blades are moistened, both above and below the bakery product, and it has been found in actual practice that this prevents the substance of the product from collecting upon the blades. Besides being useful in connection with cake and fruit pudding, this has been found especially valuable in connection with the slicing of a particular kind of bread which is quite moist and therefore has a strong tendency to accumulate on the blades and prevent efficient operation of the machine. This substance, when it dries and hardens, becomes very hard and is not only difficult to remove from the blades but actually prevents clean cut slicing. My invention substantially completely eliminates this difficulty and provides a very satisfactory machine for the accomplishment of the desired end.

In this specification and the accompanying claims, the word "blade" is intended to include the slice-cutting members, regardless of their type.

It is of course understood that the specific description of structure and method set forth above may be departed from without departing from the spirit of my invention as set forth in this specification and the appended claims.

Having now described my invention, I claim:

1. A slicing machine having an equalizer comprising a pair of plates having slots for the reception and operation of the cutting units of the slicing machine, one of which plates has grooves in its face adjacent the other plate for the reception of an absorbent strip, the second plate having grooves therein communicating with the absorbent strip for carrying liquid to the strip to saturate same, and means for feeding liquid to said grooves so that liquid may be carried to the cutting units operating in the slots in said plates.

2. In a slicing machine having a plurality of cutting blades and a slotted equalizer for guiding said blades, a slotted porous strip within the equalizer and contacting both faces of each cutting blade, and grooves in the equalizer for feeding liquid to said strip to partially or completely saturate same so that both faces of each blade will be moistened as it reciprocates through the equalizer and absorbent strip.

3. In a slicing machine having a plurality of cutting blades, a plurality of equalizers for guiding said blades, each equalizer comprising a pair of plates normally rigidly secured together, one plate of each pair being grooved on its face toward the other plate and containing in said groove an absorbent strip slotted so as to engage opposite sides of all blades and wipe them while the blades are being reciprocated, one of said plates being provided with grooves communicating with said strip whereby liquid may be carried to said strip, and means for feeding liquid to said grooves.

4. A blade moistening device for a slicing machine comprising a pair of plates adjustably secured together and each slotted to receive the blades of the slicing machine and permit same to reciprocate through the slots, one of the plates being grooved along its face which faces the other plate, an absorbent material in said groove having slots therein corresponding in location to the slots in the plates, and means for feeding oil to said material to be transferred to the blades.

5. In a slicing machine, a blade moistener comprising composition strips facing each other and being grooved on their adjacent faces, one of said grooves containing an absorbent strip slotted to engage opposite faces of the cutting blades of the machine, and a groove or grooves in the other strip communicating with the absorbent strip receiving oil from a source of supply and feeding it to the absorbent strip.

6. Blade lubricating means for a bread slicing machine comprising a pair of composite equalizers, one of them located above the course travelled by loaves of bread going through the machine and the other below this course, each equalizer comprising a pair of grooved strips having their grooved faces in close contact, a length of porous, oil-absorbent material in a groove in one of said strips, and means for feeding oil to the groove or grooves in the other strip, said equalizers having slots therethrough for the reception and reciprocation of the blades of the slicing machine.

7. A blade moistening device for a slicing machine comprising a pair of plates secured together and each slotted to receive the blades of the slicing machine and permit same to reciprocate through the slots, the plates being grooved along their meeting faces, an absorbent strip in said groove having slots therein corresponding in location to the slots in the plates, and means for feeding oil to said strip to be transferred to the blades.

OTTO F. ROHWEDDER.